No. 852,188. PATENTED APR. 30, 1907.
C. D. MANVILLE.
DRY BATTERY.
APPLICATION FILED NOV. 20, 1906.

WITNESSES
Samuel Payne
R. H. Butler

INVENTOR
Clay D. Manville
BY H. C. Everts & Co.
Attorneys

UNITED STATES PATENT OFFICE.

CLAY D. MANVILLE, OF PITTSBURG, PENNSYLVANIA, ASSIGNOR OF ONE-HALF TO JULIUS BAER, OF PITTSBURG, PENNSYLVANIA.

DRY BATTERY.

No. 852,188.      Specification of Letters Patent.      Patented April 30, 1907.

Application filed November 20, 1906. Serial No. 344.

*To all whom it may concern:*

Be it known that I, CLAY D. MANVILLE, a citizen of the United States of America, residing at Pittsburg, in the county of Allegheny and State of Pennsylvania, have invented certain new and useful Improvements in Dry Batteries, of which the following is a specification, reference being had therein to the accompanying drawings.

This invention relates to dry batteries especially adapted for use with motor vehicles.

In motor-propelled vehicles it is customary to carry a reserve supply of dry batteries, and such batteries are frequently impaired by the jar incident to the travel of the machine.

The object of the present invention is to avoid this impairment of the batteries, and it consists in cushioning a battery to avoid undue jar and agitation thereof.

The construction of the improvement will be fully described hereinafter in connection with the accompanying drawing which forms a part of this specification, and its novel features will be defined in the appended claims.

Figure 1:
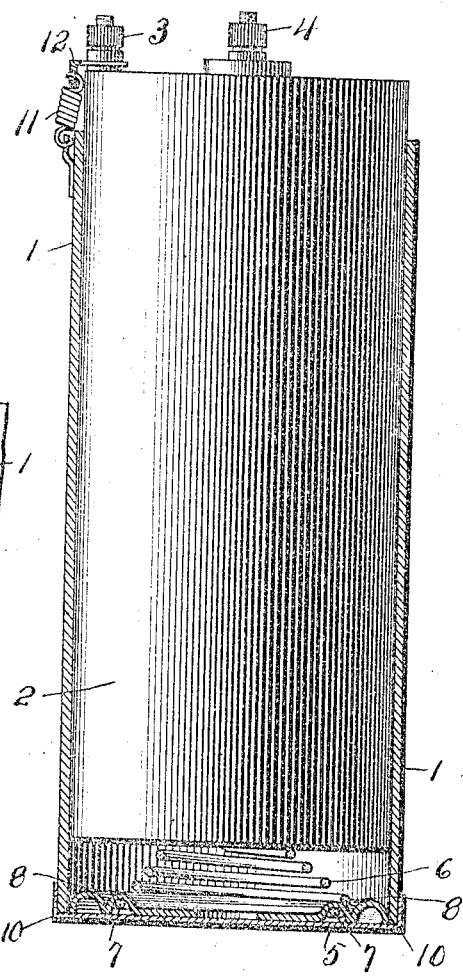
Figure 3:
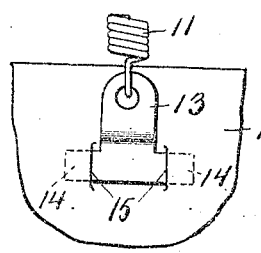
Figure 4:
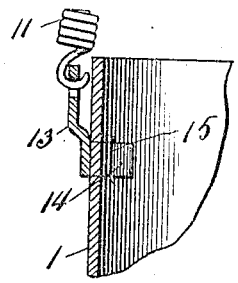
Figure 2:
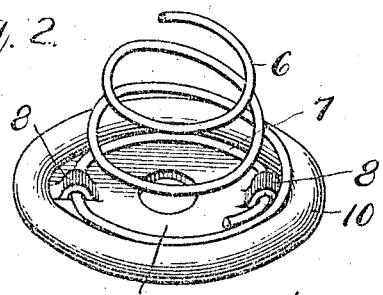

In the drawing, Figure 1 is a vertical sectional view of a battery embodying the invention, Fig. 2 is a view in perspective of the spring employed to support the lower end of the battery and its supporting disk, Fig. 3 is a detail elevation of the spring connection between the battery and its inclosing casing, and Fig. 4 is a detail sectional view of the same.

The reference numeral 1 designates a cylindrical casing such as is commonly used to inclose dry batteries and 2 designates the battery arrranged within the casing, and provided with the usual terminals 3 and 4 to which the wire conductors are attached.

Within the casing 1 and resting on the bottom 5 thereof is a coil spring 6 the lower convolution 7 of which extends through loops or keepers 8, projecting from a disk 9. This disk is preferably formed with an annular bead 10 to impart strength and rigidity thereto, and said disk affords a substantial support for the spring.

As shown in Fig. 1 of the drawing, the lower end of the battery rests upon the upper convolution of the spring 6, so that the latter supports the battery resiliently, to compensate for the shocks and jars of travel.

To limit the upward vibratory movement of the battery, I employ a spring connection 11 between the upper end of the casing 1 and the upper end of the battery 2. The upper end of this spring 11 is connected to a bracket 12 secured to the terminal 3 and the lower end of said spring is secured to a bracket 13 formed with oppositely projecting lugs 14 extending into slits 15 formed in the casing 1.

The utility of the device constructed as thus described will be readily understood. The spring 6 takes up the jar upon the battery permitting the latter to vibrate vertically without injury to its contents. The spring 11 limits the upward movement of the battery, and retracts it within the casing as will be apparent from the illustration in the drawing.

I would have it understood that the invention includes all such minor changes and modifications in construction as may be resorted to without departing from the terms and scope of the claims.

What I claim as new and desire to secure by Letters Patent, is:—

1. The combination with a casing and a battery arranged therein, of a coil spring within the casing below the battery, and means for supporting said spring comprising a disk having loops or keepers to secure the lower convolution of the spring.

2. The combination with a casing and a battery therein, of a coil spring within the casing below the battery, and a spring connection between the upper end of the battery and the upper end of the casing.

3. The combination with a casing and a battery therein, of a disk resting on the bottom of the casing, a coil spring secured to said disk, and a resilient connection between the upper end of the battery and the upper end of the casing.

4. The combination with a casing and a battery arranged therein, of a spring within the casing below the battery and supporting the latter, and a spring located exteriorly of the casing having one end connected to the latter and its other end connected to the battery.

In testimony whereof I affix my signature in the presence of two witnesses.

CLAY D. MANVILLE.

Witnesses:
  MAX H. SROLOVITZ,
  F. O. McCLEARY.